(12) United States Patent
Locker et al.

(10) Patent No.: US 10,402,407 B2
(45) Date of Patent: Sep. 3, 2019

(54) CONTEXTUAL SMART TAGS FOR CONTENT RETRIEVAL

(71) Applicant: Lenovo (Singapore) Pte. Ltd., Singapore (SG)

(72) Inventors: Howard Locker, Cary, NC (US); Rod D. Waltermann, Rougemont, NC (US); Daryl Cromer, Cary, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 13/919,376

(22) Filed: Jun. 17, 2013

(65) Prior Publication Data
US 2014/0372467 A1    Dec. 18, 2014

(51) Int. Cl.
*G06F 16/00*    (2019.01)
*G06F 16/2457*    (2019.01)

(52) U.S. Cl.
CPC .............. *G06F 16/24575* (2019.01)

(58) Field of Classification Search
USPC ........................................................ 707/766
See application file for complete search history.

(56) References Cited

U.S. PATENT DOCUMENTS

| | | | | |
|---|---|---|---|---|
| 8,566,329 | B1 * | 10/2013 | Freed et al. | 707/748 |
| 9,633,083 | B2 * | 4/2017 | VanBlon | G06F 17/3053 |
| 2007/0078832 | A1 * | 4/2007 | Ott, IV | G06F 17/30867 |
| 2007/0185858 | A1 * | 8/2007 | Lu et al. | 707/5 |
| 2008/0005068 | A1 * | 1/2008 | Dumais | G06F 17/30528 |
| 2013/0262463 | A1 * | 10/2013 | Chittar | G06F 17/30595 |
| | | | | 707/736 |
| 2015/0161206 | A1 * | 6/2015 | Waltermann | G06F 17/30663 |
| | | | | 707/722 |

FOREIGN PATENT DOCUMENTS

| | | |
|---|---|---|
| CN | 1816809 A | 8/2006 |
| CN | 101283353 A | 10/2008 |
| CN | 102467541 A | 5/2012 |
| CN | 102708185 A | 10/2012 |

* cited by examiner

*Primary Examiner* — Belix M Ortiz Ditren
(74) *Attorney, Agent, or Firm* — Ference & Associates LLC (57) ABSTRACT

An aspect provides a method, including: obtaining, at an information handling device, user input search data; accessing contextual data; refining, using one or more processors, the user input search data based on the contextual data; searching, using one or more processors, a repository of stored tag data with refined user input search data to identify one or more stored tags matching one or more stored objects; and returning, using one or more processors, one or more results of the searching, the one or more results indicating one or more stored objects associated with stored tag data. Other aspects are described and claimed.

20 Claims, 8 Drawing Sheets

CONTEXTUAL SMART TAGS FOR CONTENT RETRIEVAL

BACKGROUND

Information handling devices ("devices") come in a variety of forms, for example laptop computing devices, tablet computing devices, smart phones, e-readers, MP3 players, and the like. Such devices are configured for media consumption and users typically store "files", e.g., music, videos, pictures, documents, etc. (hereinafter simply "objects") on the devices.

For example, a typical device user may have thousands and thousands of objects (files, pictures, content, etc.) scattered across his or her device. To compound this, with the advent of cloud computing and remote storage, a user may have objects scattered across many devices (e.g., laptop, tablet, smart phone, work station, etc.) and in cloud storage device(s). The user might remember some things about an object he or she wishes to retrieve, but the user nevertheless often may find it difficult to find it quickly. For example, many devices create media file names that are less than helpful (e.g., a number corresponding to a digital image captured by a smart phone and stored on the smart phone locally and in a cloud or other network connected device). Even if the user has chosen a memorable file name or storage folder, object retrieval can prove challenging in the current use environment where typically the objects are scattered throughout the device and/or devices and not well organized from a retrieval standpoint.

BRIEF SUMMARY

In summary, one aspect provides a method, comprising: obtaining, at an information handling device, user input search data; accessing contextual data; refining, using one or more processors, the user input search data based on the contextual data; searching, using one or more processors, a repository of stored tag data with refined user input search data to identify one or more stored tags matching one or more stored objects; and returning, using one or more processors, one or more results of the searching, the one or more results indicating one or more stored objects associated with stored tag data.

Another aspect provides an information handling device, comprising: one or more user input devices; one or more processors; a memory device storing instructions accessible to the one or more processors, the instructions being executable by the one or more processors to: obtain, from the one or more user input devices, user input search data; access contextual data; refine, using the one or more processors, the user input search data based on the contextual data; search, using the one or more processors, a repository of stored tag data with refined user input search data to identify one or more stored tags matching one or more stored objects; and return, using the one or more processors, one or more results of the searching, the one or more results indicating one or more stored objects associated with stored tag data.

A further aspect provides a computer program product, comprising: a storage medium having computer readable program code embodied therewith, the computer readable program code comprising: computer readable program code configured to obtain user input search data; computer readable program code configured to access contextual data; computer readable program code configured to refine, using one or more processors, the user input search data based on the contextual data; computer readable program code configured to search, using one or more processors, a repository of stored tag data with refined user input search data to identify one or more stored tags matching one or more stored objects; and computer readable program code configured to return, using one or more processors, one or more results of the searching, the one or more results indicating one or more stored objects associated with stored tag data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described in further detail herein, a user is often faced with a serious challenge when attempting to find an object he or she wants, and it is often doubly challenging to find the object quickly. Such a user would benefit greatly from a retrieval mechanism that operates on the principle of tagging objects with data regarding "some thing(s) you will remember a year or more later". Of course painstaking planning at object creation time might supply such a functionality (e.g., manually typing in this sort of information), but this burdens the user at object creation time. For example, what is needed is a tagging system that allows a user to find what he or she wants by just remembering the things he or she naturally remembers about the object. Some non-limiting examples include a user remembering that he or she was at a restaurant with Bill and Ted last winter, or that the object was a document about sensors that a particular company was working on for release in the year 2015. Additionally, the user might not remember the object(s), but only that there must be some related objects saved somewhere, e.g., a user may want the ability to find objects that are similar (same people, same topic, etc.) to a first object.

Today users are limited in their object retrieval choices. For instance, users are basically limited to only searching by file name and/or date that file was modified, and/or information inside the file for some type of files (e.g., words contained within a Microsoft WORD document). Unfortunately, from a usability stand point, this is either entirely ineffective (e.g., file name on a video file is a machine generated number) or simply frustrating, as this is not the way our minds work to remember clues about the object (and that are not necessarily in the object), especially if it is a non-data object (picture, video, etc.) or a data object that the user did not create.

Accordingly, an embodiment provides the ability to use smart tags for object retrieval. An embodiment permits, for example, the user of audio (e.g., speech data) to create tags which contain metadata associated with the object, for example when the object is created. As an example, consider a camera application on a smart phone. In an embodiment, when the user gets ready to take a picture (e.g., opens the camera application) an embodiment queries a user if he or she wants to add smart tags. If the user does, an embodiment allows smart tagging, e.g., collection of speech data to create the smart tags for an object (e.g., picture).

For example, if a user happens to be taking pictures of Bob's 50th birthday party, the user could simply say "Bob's 50th birthday party" to provide speech input for creating a smart tag for the object to be created, i.e., the picture. This information is then processed (e.g., converted using a speech to text mechanism) and stored as a separate tag or tags with a link/naming convention linking it the object (picture). Example embodiments are described throughout extending this general theme, for example providing smart tags created for videos, office documents, etc. Moreover, the source of data for smart tag creation can be derived from many sources and associated with various objects in a variety of ways. These smart tags, their creation, use, management and processing, are provided by the various embodiments, as outlined throughout this description by way of example, and greatly ease the task of object retrieval.

The illustrated example embodiments will be best understood by reference to the figures. The following description is intended only by way of example, and simply illustrates certain example embodiments.

Figure 1:
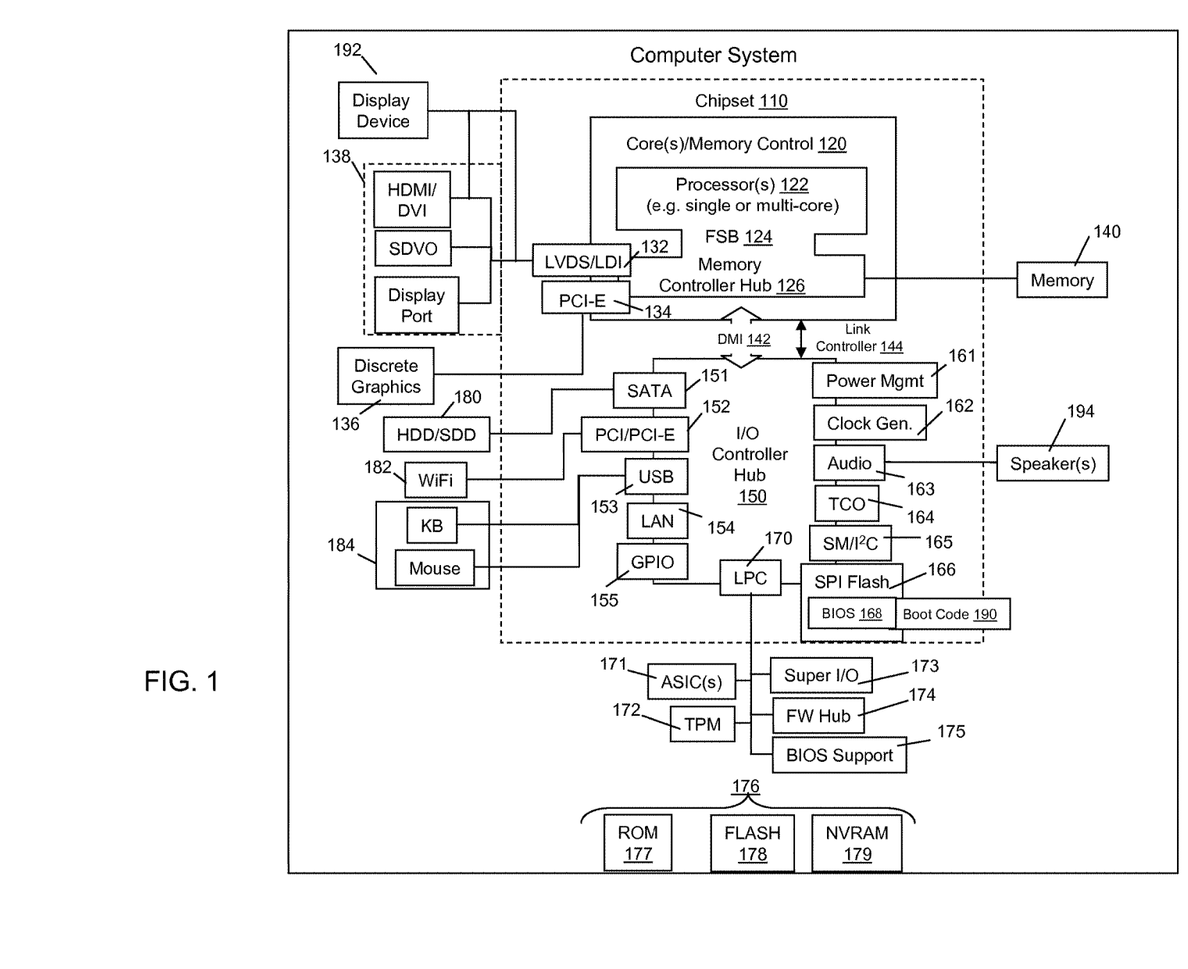
FIG. 1 illustrates an example of information handling device circuitry.
Figure 2:
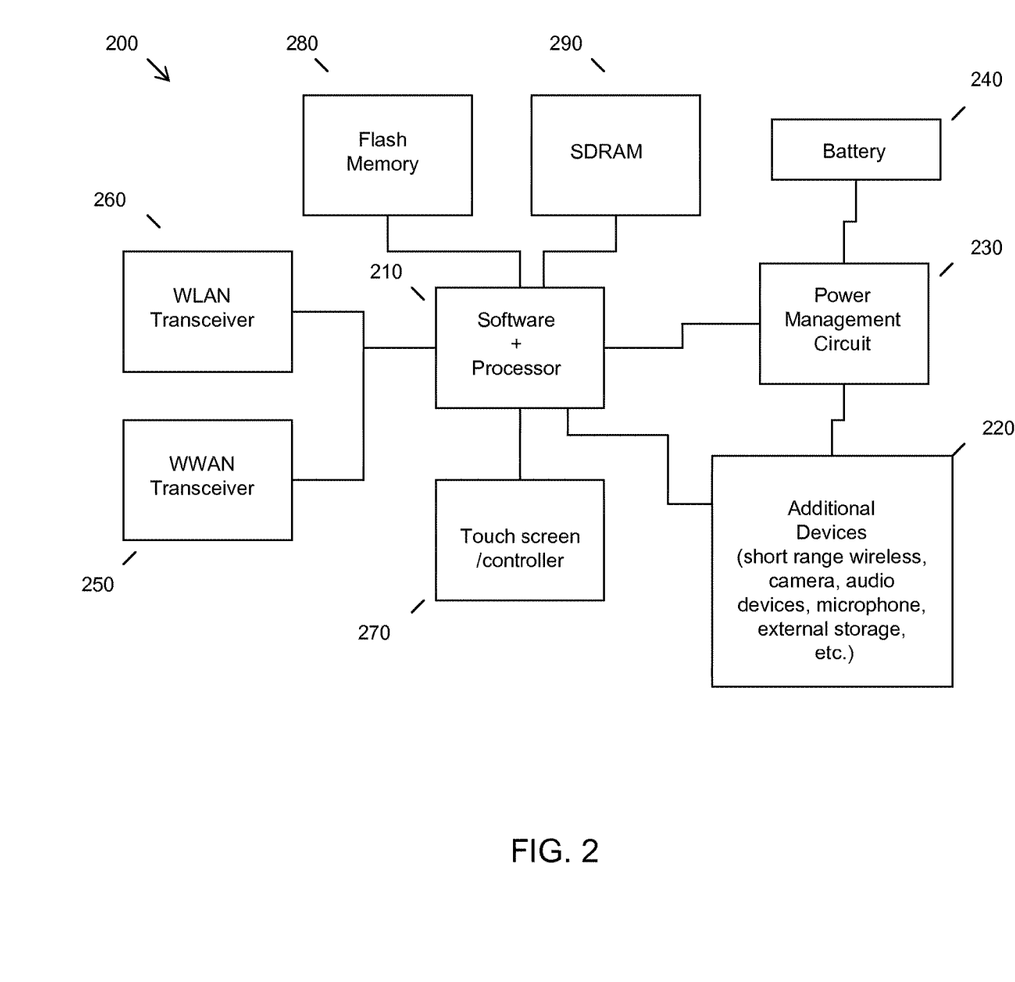
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide smart tag functionality, as described herein. The example devices outlined in FIG. 1 and FIG. 2 are non-limiting examples and another device or devices may be utilized. The devices may provide this at the time of object creation, after object creation, or prior to object creation. The association, organization and use of smart tags are described throughout and the specific examples given are meant to be non-limiting in nature.

Figure 3:
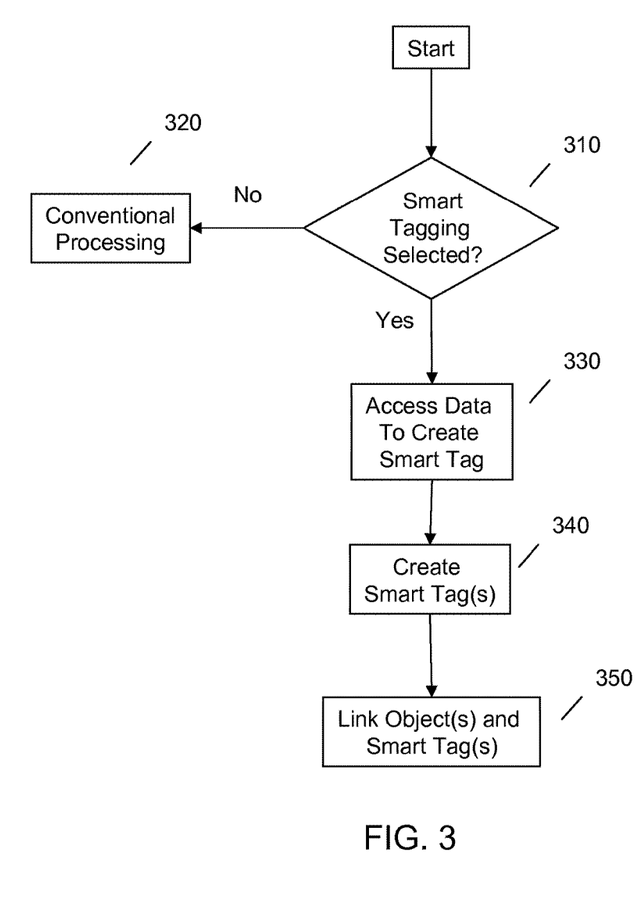
FIG. 3 illustrates an example method of creating smart tags for objects.

In FIG. 3 a general overview of smart tag creation is outlined. At 320 an embodiment determines if smart tagging is selected by the user. This may be accomplished in a variety of ways. For example, referring to a context where a user is taking pictures with a camera application of a smart phone, an embodiment may query the user prior to capturing the picture, e.g., when the camera application is launched. Alternatively or additionally, an embodiment may query the user for smart tagging options after the picture is captured. If the user does not wish to engage in smart tagging the object(s), normal processing may occur at 320 (e.g., simply saving the picture in a predetermined location with a stock file name).

If the user opts into smart tagging, at 330 an embodiment may access data to create a smart tag or several smart tags. In the example above regarding the picture, this may include capturing user voice input, but this is by no means limiting. Other sources of smart tag data are available, such as location information (e.g., from a GPS of the device), time information (e.g., from a clock or calendar application of the device), context information (e.g., other smart tags for similar objects). Various examples will be given throughout regarding the rich and extensive nature of available smart tag data.

At 340 an embodiment creates a smart tag for the object (e.g., a picture just captured or to be captured). This smart tag, e.g., "Bob's 50$^{th}$ birthday" is then linked or otherwise associated with the object such that it can serve a locating function during retrieval activities, as further described herein.

Thus, in the example of an office document, on the first save an embodiment may ask the user at 310 how he or she wants to describe this object. Or, if the user saves a file from an email, an embodiment might ask the user at 320 how he or she wants to describe this object. An embodiment then facilitates the creation of smart tag(s) for the object in question in 330 and 340, as well as creation of a link or association at 350, thus permitting advanced retrieval options to the user. Moreover, once a user provides a smart tag, e.g., to a first photo, an embodiment may automatically provide the same or similar smart tags to other objects based on a similarity metric, e.g., all other photos taken in the same place over the next x units of time may carry the same tag, so no need to retag every photo, etc.

Figure 4:
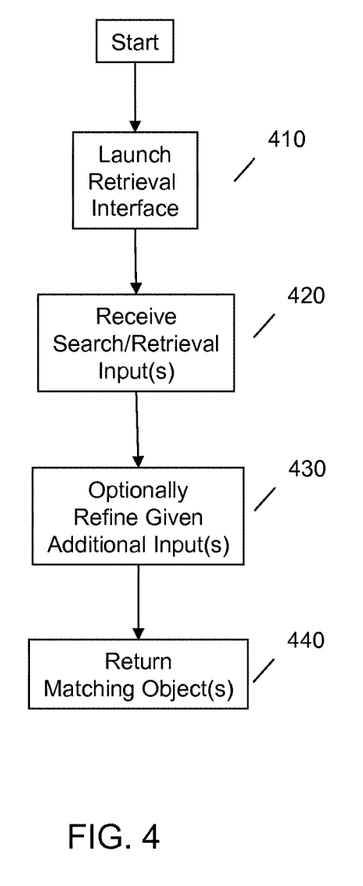
FIG. 4 illustrates an example method of retrieving smart tagged objects.

For example, referring to FIG. 4, an embodiment may provide a search application that allows the user to input the metadata, i.e., corresponding to the smart tag, to ease the burden of object search and retrieval. Thus, an embodiment allows a user to launch a retrieval application at 410 and simply say "find pictures of Bob's 50$^{th}$ birthday". An embodiment may employ filtering, e.g., removing certain words such as "find" as not being data to base the search and retrieval on but simply treat this input as a command associated with key words of phrases. Moreover, an embodiment may employ analysis of the input(s), e.g., language analysis in the example of speech input, to parse the spoken phrase into component parts.

An embodiment, as indicated at 420, may allow the user to provide more than one input or a continuing stream of input. Thus, as the user adds more input (e.g., speaks more words), the search becomes more refined. In this regard, it should be appreciated that an object may have many (e.g., hundreds or thousands) of smart tags associated or linked to it. Thus, in an embodiment, a search may start using an initial input and continually be refined at 430 dependent on the nature of the user-provided inputs.

As will be appreciated, this permits an embodiment to start at a search that matches thousands of objects (e.g., matching simply "Bob's") and narrow the results list down to hundreds (e.g., matching both "Bob's" and "50$^{th}$") and further to tens of objects (e.g., matching all of "Bob's" and "50$^{th}$" and "birthday"), etc. Optionally, a user may provide more than one mode of inputs at 420 and/or 430. For example, an embodiment may also receive gestures (e.g., finger input on an object thumbnail icon or preview in the results list of particular relevance to the user's search) for final selection ordering, for example where the results list is being narrowed down to a final few objects. It should be understood that the smart tags being searched in the query might include data from existing (conventional) metadata (e.g., location, date, etc., typically associated with a file). It is also possible for the user to type the input in instead of speaking it, or some suitable combination of input methods, as described herein. Therefore, an embodiment provides an additional source of data, i.e., the smart tags, which may be searched and used for retrieving linked objects.

Voice Data for Smart Tags

While native and web-based search engines are powerful, they primarily search file name and other metadata that may not match the user's naturally occurring thoughts of the respective object. Ultimately, many searches result in the user searching through a long list of generally applicable search hits or giving up the search entirely.

An embodiment therefore leverages automatic creation or prompted collection of a "natural association" smart tag based on voice data that is detected during creation of the object. In one embodiment, a mechanism is provided for automatically establishing probable smart tags by mining audio that is captured for example during object creation, e.g., recording of motion video along with audio or after creation of an object, e.g., after a snapshot is taken.

Figure 5:
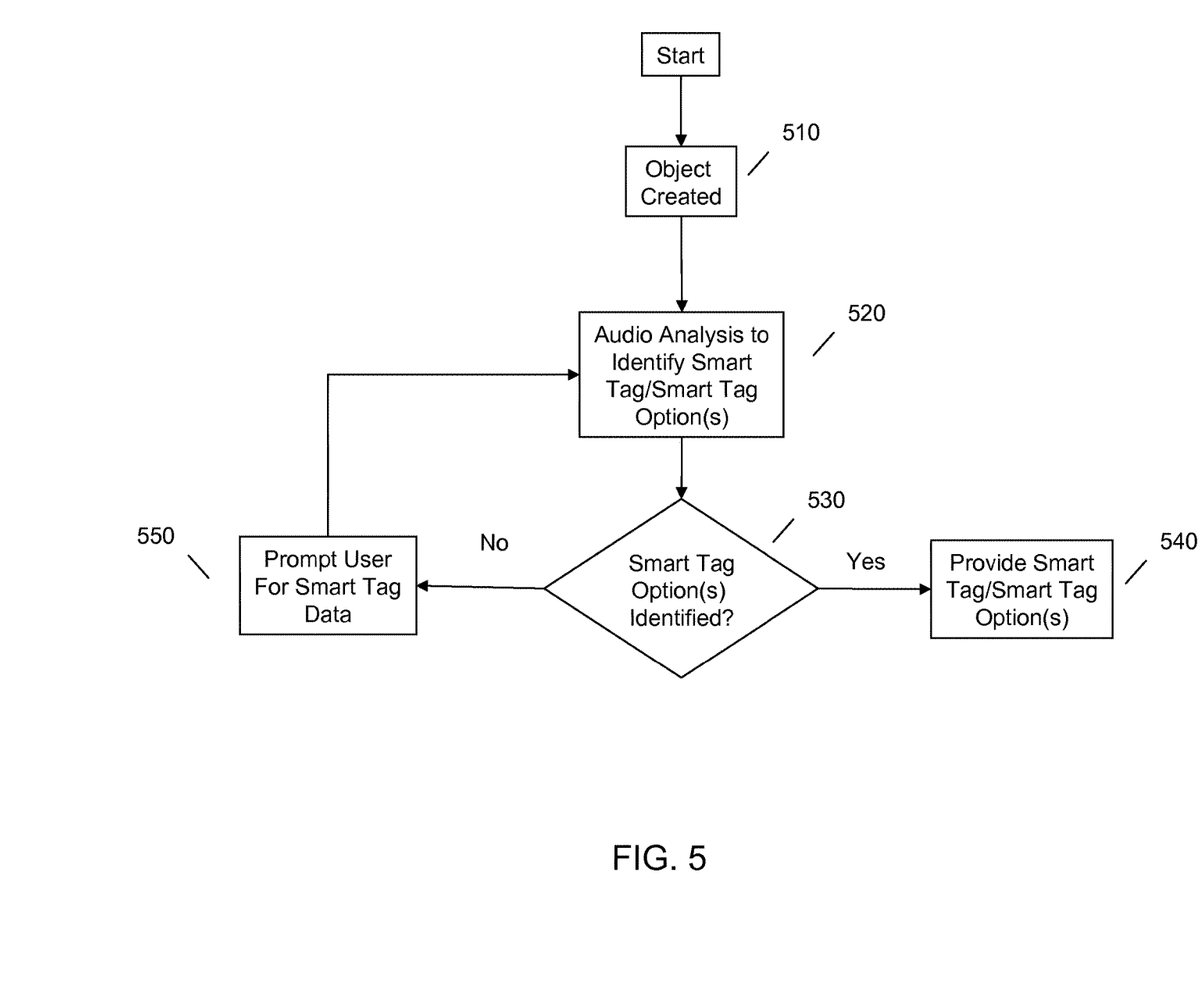
FIG. 5 illustrates an example method for obtaining smart tag data.

Referring to FIG. 5, following creation of an object at 510, an embodiment may analyze the audio data of the object (e.g., audio data of a video file) at 520 and/or prompt the user at the end of object creation at 540, e.g., recording or snapshot, with top n tag options and/or with an automatically choose one as a smart tag. It should be noted that this analysis at 520 may be done in addition to or as an alternative to prompting a user at the start of creating the object and/or prompting the user at the end of object creation. Then, once the object is completed an embodiment may run step 520 to auto add smart tags to the smart tags the user creates.

Identification and/or choosing of a smart tag may be based on an analysis of which word or words that are determined to be of importance or relevance to future object retrieval. A variety of techniques may be employed, as described herein. One example includes identifying names, events or verbs (or a combination thereof) that allow for an inference of context and thus importance.

As an example, if a user is recorded speaking "it's Jimmy's first birthday!" during the video as well as "he is blowing out the candles" an embodiment may analyze the audio portion of the file at 520 to identify smart tag options to be presented to the user at 540. For example, an embodiment may provide a first smart tag option of "Jimmy's first birthday" and a second smart tag option of "blowing out the candles", etc.

If a smart tag is to be automatically chosen as part of the analysis, for example based on relevance, an embodiment may promote a single smart tag (i.e., the chosen smart tag) to the user, may automatically apply the smart tag to the object, or may highlight the chosen smart tag, e.g., for approval by the user.

In an embodiment, mechanisms may reduce or prioritize the data analyzed at 520. For example, automatic recording could prioritize mining the first or last x seconds of video recording or x seconds after snapshot, e.g., in order to choose specific times relevant to object creation that may be more likely to capture relevant audio for creation of smart tags. Over time, a user may customize or even learn when to provide voice data such that a smart tag of particular importance can be created.

As described herein, an embodiment may supplement the data used to create smart tags. For example, if no probable voice tag is identified at 530, an embodiment may prompt the user to provide smart tag data (e.g., speech input) at 550. An embodiment may provide an additional analysis to determine what occurred to preclude appropriate smart tag data collection. For example, if at 530 an embodiment determines that no smart tag options have been identified, an embodiment may determine that no or weak voice recording is detected when voice recording is in effect. An embodiment may analyze the process, e.g., automatically toggle through beam form settings to ensure noise cancellation is not to blame. As a result of this analysis, an embodiment may automatically adjust settings (e.g., noise cancellation) or provide the user with a prompt with such suggested correction(s).

The prompting for additional data may occur at a variety of times, for example after the audio analysis at 520, as described in the example above, at the conclusion of object creation, prior to object creation, or the like. Thus, the prompting of the user for smart tag data may not be reliant on the inability of an embodiment to automatically suggest smart tags, but may supplement this process.

In this regard, an embodiment may, e.g., as part of prompting the user for smart tag data at 550, provide a notification to the user that the device is attempting to obtain smart tag data. Such notification may come in a variety of forms, for example an audible, haptic or on-screen feedback which helps to inform the user when voice recording as begun and ended. This notification may be included in a separate prompting of the user for smart tag data and/or may take place at other time(s), for example when the device is automatically recording speech data (e.g., at the beginning and end times of object creation).

Similarly, an embodiment may access additional data to select or promote smart tags. As an example, an embodiment may aggregate mining of audio across objects (e.g., video files or snapshots recorded at similar times and/or locations). Thus, it may occur that the most relevant smart tag occurs during snapshot two of six (in a series of snapshots where all six where taken in approximately the same time and location). Following an analysis of each object's smart tag data, a determination may be made that "Jimmy's 1st birthday" is a common and relevant phrase for each. The snapshots may then have smart tags applied or promoted (re-ordered) such as "Jimmy's 1st birthday_1", "Jimmy's 1st birthday_2", etc. Thus, an embodiment may perform a post object creation analysis, e.g., following the last in a series of snapshots, in order to provide further analysis of the smart tag data. This provides the user with the ability to review and edit the smart tag(s) for objects, even previously chosen smart tags.

Such an approach may also be used once objects (e.g., picture files) are stored in a central repository (e.g., a cloud folder). An embodiment may therefore mine across files captured from different devices (e.g., from multiple smartphones) if they share a similarity metric (e.g., time and location) as well as automatically captured smart tags.

Strong Tags

Various embodiments may leverage a variety of data sources to form and refine smart tags. As an example, as an alternative to a user providing speech or other input as a source of smart tag data for an object, or in addition to this process, an embodiment may analyze data of the object itself. An embodiment additionally may process the smart tag data to create a refined set of tags or "strong" tags.

Figure 6:
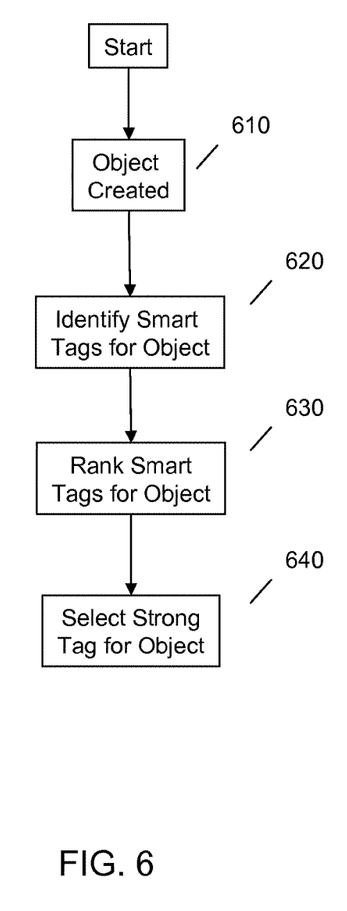
FIG. 6 illustrates an example method for refining smart tag data for an object.

As an example, after an object (e.g., a video file) is created the audio of the file may be analyzed to create a strong tag. A "strong" tag is a tag that is descriptive yet selective enough that it will not have many matches outside of the object in question (e.g., the video file in this example). To determine a descriptive score for selecting a strong tag, an embodiment may run or otherwise process the audio through an analysis to identify smart tags for the object at 620, e.g., by determining relevant words or phrases, for example via employing a Named Entity Recognition (NER) process. NER maps the audio to proper names, such as people or places, and what the type of each such name is (e.g., person, location, organization).

An embodiment, having identified smart tags for an object at 620, may rank the smart tags for the object at 630 in order to identify a strong tag for the object. For example, over the course of the video a table or other organized structure may be built to keep track of the number of instances of each NER item. An embodiment may also process the video though voice recognition and identify NER items spoken by the video owner or device user. The owner or device user may be the creator of the video object and/or the current owner of the video object.

An embodiment may select the strong tag at 640 by ordering the NER items that have the highest counts within the video and/or giving NER items spoken by the owner or device user a multiplier so they move towards the beginning (have a higher ranking) As described further herein, an embodiment may then perform a search using each NER item on previously created videos to see how selective the NER item is for the particular object. The lower amount of objects (e.g., videos) selected, the higher the selective score is for that NER item.

An embodiment therefore may rearrange the order of the NER items by taking more selective items and moving them closer to the beginning (making their ranking higher). The strong tag for the object is thus selected at 640 by selecting the smart tag having the highest ranking given the analysis (or analyses) and ranking methodology employed.

As described herein, an embodiment may then use a search application that allows the user to input potential smart tags (or portions thereof) and as the user adds more smart tags the search becomes more refined. Because an embodiment weights the smart tags, or provides strong tag(s) for object(s), the user can get to the desired object with a minimum amount of input (e.g., spoken words). This may also serve to reduce the number of smart tags for an object, as an embodiment may remove some data identified as smart tags but having a low enough rank to not warrant retaining as such.

Aggregate Tagging Across Objects

Figure 7:
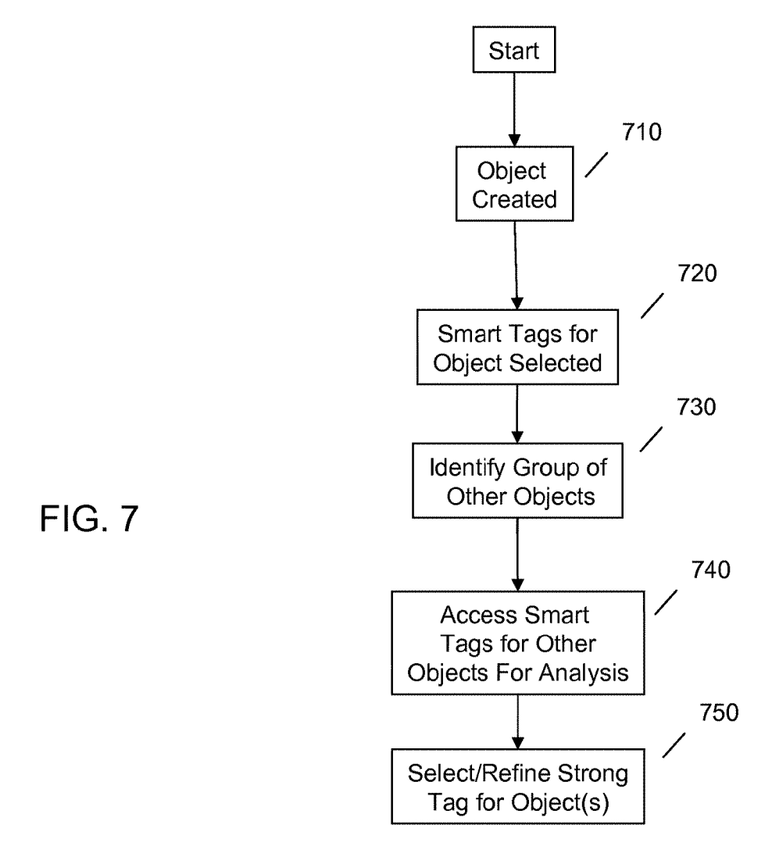
FIG. 7 illustrates an example method for refining smart tag data for an object considering other objects.

As illustrated in FIG. 7, at various times, e.g., as each new object is created at 710, a process (e.g., in real time and/or post processing as a background process) of an embodiment may compare the new object's smart tags that have been selected at 720 to existing objects' smart tags (including the strong tags). The objects chosen for comparison at 730 may be based on a similarity metric or metrics, for example, similar times and/or locations associated with the objects. So in the example of Bob's $50^{th}$ birthday party, all picture objects taken within that timeframe and that location may be grouped together as a "group" for such a comparison. Other similarity metrics may be used, in addition to or in lieu of the examples given above.

The smart tags for each object within the group may be accessed and analyzed at 740. For example, an embodiment may analyze other object's smart tags at 740 to determine the "strongest" tag for the group of objects and/or to re-order in some way the ranking of the objects' various smart tags at 750. The "strongest" tag is something that is descriptive yet selective enough that it will not have many matches outside of the "group". The nature of the analysis at 740 may be one of frequency and/or weighted relevance.

For example, to determine a score or ranking, an embodiment may run each smart tag though a relevance analysis, for example a named entity recognition (NER) process. The higher the instances of people, places, locations, organizations, etc., in the smart tag, the higher the NER score.

An embodiment, as part of the analysis at 740, may also perform a search using the object's strong tag on previously created groups of objects to see how selective the strong tag is. The lower amount of groups selected, the higher the selective score is. The smart tag from the group in question with the highest score (e.g., combined NER and selectivity score) may be considered the strongest tag for the group in question. Similarly, other smart tags may be re-ordered or re-ranked on the basis of such a group analysis.

An embodiment therefore may select and/or re-order smart tags (including selecting of a strong tag) at 750 on the basis of a group of similar objects. The strongest tag for example determined on the basis of the group analysis may then be added to every object within the group in question in addition to any tags (strong or smart tags) that are unique to the object within the group. An embodiment may extend this to be used once objects are stored in a central repository (e.g., a cloud folder). An embodiment may thus mine across objects captured from different devices (e.g., from multiple smartphones), e.g., if they share a similarity metric, e.g. creation times, locations, etc., to create a cloud group. An embodiment may recreate a new strongest cloud tag using the larger amount of objects within the cloud and add this tag to all objects in the cloud group, e.g., as a sort of global maximum strongest tag.

Additionally or in the alternative, the smart tags may be analyzed in a group-focused fashion to select (or reselect) a strong tag for an object. Thus, an object may have a strong tag selected for it based on an analysis of a group of objects at 740. Previously selected strong tags may be revised at 750 given such an analysis, such as adding a new strong tag to an object previously assigned another strong tag. It should be understood that the new strong tag may be selected from an object's list of existing weaker tags (smart tags not previously selected as the strong tag) or may be a new tag entirely (i.e., a smart tag identified via group analysis and not previously included with a given object).

Therefore, an embodiment may leverage knowledge gleaned from analyzing a group of objects to make informed decisions regarding smart tags, including the ordering or ranking of smart tags and/or the selection of a strong tag. The group again may be based on a single device or may be based on a plurality of devices (e.g., in the example of a cloud group). An embodiment may provide such group based analysis at a variety of times, e.g., in real time as an object is created (captured, saved, downloaded, transferred, etc.) and/or as a post processing or intermittent step (e.g., daily, weekly, etc.).

Smart Tags with Added Contextual Relevance

Figure 8:
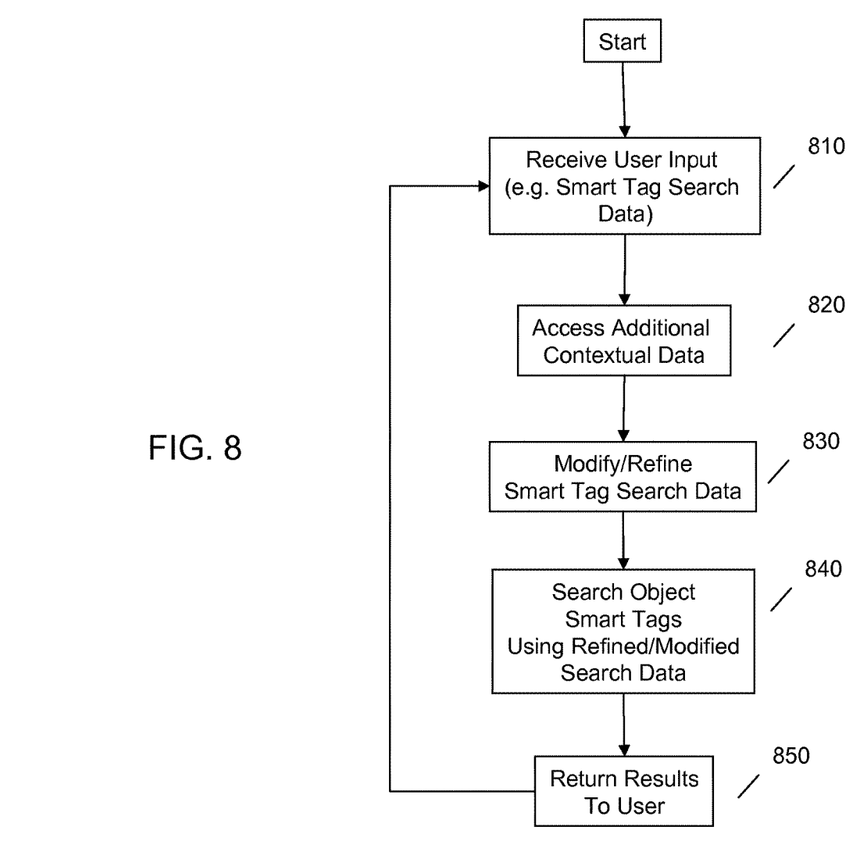
FIG. 8 illustrates an example of refining smart tag search queries given contextual data.

Referring to FIG. 8, an embodiment provides a method that uses strong tags in combination with weaker tags and a rating system involving machine confidence factors and a user rating scheme. This method of combining many weak forms of data along with a strong form allows for significantly greater precision in results returned, thus giving the user a smaller number of results to filter through, and fewer, to no wrong results returned.

In an embodiment, two or more types of smart tag data are managed, e.g., machine generated smart tag data and user created smart tag data. Relevance may be determined depending on the particular search query and what may be inferred about the user.

For example, depending on the words used in search query an embodiment will rate the confidence of the smart tags contained in the query directed to a smart tag repository. Thus, if a user submits a search query for pictures taken on a particular date, machine generated data in smart tags for picture objects having date information would have a high priority (in terms of relevance). Another example would be to utilize relevance in the query correlated to other information the known about the user, for example what music is stored in the user's library and the user's contacts in the system.

So for example if a user has a large collection of a particular artist's music that they have not listened to in about a month and the user also has a nephew with the same name as the artist in their contacts, a query using that name, i.e., shared by the artist and the nephew, may give varying results given the context of the search query. That is, the search could find objects related to the artist, e.g., music files, objects related to the nephew, e.g., picture files, or both types of objects.

An embodiment leverages additional contextual data to provide added contextual relevance to the search. For example, suppose that there was an event on the calendar of the user's device last weekend denoting the nephew's birthday party. Along with the key words of the nephew's name in the search query (e.g., provided by the user), an embodiment now has an additional piece of information to aid in the search query for objects. Furthermore, if the user provided a search query of "pictures of Name A", an embodiment would have many pieces of information: 1) that the user has queried Name A; 2) that the user has not listened to artist Name A in a while; and 3) that the user is looking for pictures (e.g., the search was not to "play Name A"). Additionally, an embodiment has at least two time relevance pieces of information, namely, 1) that the nephew's birthday happened recently (i.e., last week in the calendar event) and 2) that the nephew is a name in the contacts. These two time based items, and the fact that the user is looking for pictures, leads an embodiment to a stronger tie to the nephew in the contacts, so an embodiment may provide a search that implicitly also adds a date range (e.g., including objects created or obtained within a date range for the birthday) along with smart tags the user supplied (i.e., pictures and Name A).

Thus, an embodiment uses the new search tags as follows: "Name A", "Pictures" and "Date/time of Name A's birthday". Thus, as illustrated in FIG. 8, an embodiment first receives input (e.g., smart tags spoken by the user) to start a search query at 810. An embodiment then accesses additional data that is useful in inferring context to the input search tag data at 820. As described herein, the sources of this contextual data may include contact data, calendar data, and the like, but is not so limited. Additional data may be accessed on the device, e.g., user search history, purchase histories, etc., and additionally or alternatively, cloud based data may be accessed (e.g., this and/or related user data in the cloud may be accessed to add context to the search). Contextual data may data derived or obtained from one or more of a device application and a sensor. For example, contextual data may include location data or data indicative of a location, environmental factors (e.g., temperature, light, humidity and the like), biometric data (e.g., using a sensor to detect or infer a user's mood, blood pressure, facial expression, etc.). Moreover, the objects to which the contextual data relates may be a variety of object types, e.g., files a user may create or use such as word processing documents, PDF documents, text documents, etc.

Following the obtaining of additional contextual data at 820, an embodiment may modify or refine the search input (e.g., add additional smart tags to the search) at 830. This refined search then may be issued at 840 to search a repository of smart tag data and retrieve objects having smart tags linked thereto that match those used in the query. This search may again be a local search (i.e., limited to the objects of a user's device) and/or may include other devices (e.g., objects maintained in cloud storage data, additional user devices linked to the device that received the query, e.g., as linked in a cloud account), etc. An embodiment then returns results to the user indicating the objects found to match the search at 850. Of course, the user may refine the results by sorting them, issuing an additional query, modifying how the search query is modified at 830, and the like. Thus, this process may be repeated as necessary until a results list is returned to the user that matches the user's intent, i.e., for the particular objects linked to smart tags the user intends to find.

It will be readily understood by those having ordinary skill in the art that the various embodiments or certain features of the various embodiments may be implemented as computer program products in which instructions that are executable by a processor are stored on a computer readable or device medium. Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    forming one or more tags from audio data provided by a user, wherein the audio data is captured at substantially the same time as a digital object created by the user, wherein the audio data and the digital object are associated with a physical event and associating the formed one or more tags with the digital object;
    thereafter obtaining, at an information handling device, search data;
    identifying a group of objects corresponding to the search data, each of the objects within the group having at least one associated tag formed from audio data, wherein the identifying comprises selecting objects having a similarity to the digital object;
    accessing the at least one associated tag of each of the group of objects;
    modifying, using one or more processors, the search data based on the associated tags of the group of objects, the modifying comprising modifying the search data with at least one of the associated tags of the group identified as being relevant to the group and not included in the search data;
    searching, using one or more processors, a repository of stored tag data using the modified search data to search one or more stored tags to find matching one or more stored objects; and
    returning, using one or more processors, one or more results of the searching, the one or more results indicating one or more stored objects associated with stored tag data.

2. The method of claim 1, wherein the contextual data comprises contextual data obtained from the information handling device.

3. The method of claim 2, wherein the contextual data comprises data obtained from one or more of a device application, a sensor, and an element having data indicative of location.

4. The method of claim 1, wherein the contextual data comprises contextual data obtained from one or more other devices.

5. The method of claim 4, wherein the one or more other devices comprise one or more devices associated via a cloud-based association.

6. The method of claim 1, wherein the repository of stored tag data comprises one or more of tags derived from user input and tags derived from machine input.

7. The method of claim 6, wherein the contextual data influences which of the one or more tags is weighted more heavily in the searching based on a named entity recognition process.

8. The method of claim 6, wherein the one or more tags derived from user input are derived from user input provided separately from object data.

9. The method of claim 8, wherein the user input comprises one or more of speech input, text input, touch, gesture.

10. The method of claim 1, wherein the one or more stored objects comprise one or more of:
    one or more objects stored on the information handling device; and
    one or more objects stored on other devices accessible to the information handling device.

11. An information handling device, comprising:
    one or more user input devices;
    one or more processors;
    a memory device storing instructions accessible to the one or more processors, the instructions being executable by the one or more processors to:
    forming one or more tags from audio data provided by a user, wherein the audio data is captured at substantially the same time as a digital object created by the user, wherein the audio data and the digital object are associated with a physical event and associating the formed one or more tags with the digital object;
    thereafter obtain, from the one or more user input devices, search data;
    identify a set of stored objects corresponding to the search data, each of the stored objects within the group having at least one associated tag formed from audio data, wherein to identify comprises to select objects having a similarity to the digital object;
    access the at least one associated tag of each of the group of objects;
    modify, using the one or more processors, the search data based on the associated tags of the set of stored objects, the modifying comprising modifying the search data with at least one of the associated tags of the group identified as being relevant to the group and not included in the search data;
    search, using the one or more processors, a repository of stored tag data using the modified search data to search one or more stored tags to find matching one or more stored objects; and
    return, using the one or more processors, one or more results of the searching, the one or more results indicating one or more stored objects associated with stored tag data.

12. The information handling device of claim 11, wherein the contextual data comprises contextual data obtained from the information handling device.

13. The information handling device of claim 12, wherein the contextual data comprises data obtained from one or more of a device application, a sensor, and an element having data indicative of location.

14. The information handling device of claim 11, wherein the contextual data comprises contextual data obtained from one or more other devices.

15. The information handling device of claim 14, wherein the one or more other devices comprise one or more devices associated via a cloud-based association.

16. The information handling device of claim 11, wherein the repository of stored tag data comprises one or more of tags derived from user input and tags derived from machine input.

17. The information handling device of claim 16, wherein the contextual data influences which of the one or more tags is weighted more heavily in the searching based on a named entity recognition process.

18. The information handling device of claim 16, wherein the one or more tags derived from user input are derived from user input provided separately from object data.

19. The information handling device of claim 18, wherein the user input comprises one or more of speech input, text input, touch, gesture.

20. A computer program product, comprising:
    a storage device having computer readable program code embodied therewith, the computer readable program code being executable by a processor and comprising:
    computer readable program code that forms one or more tags from audio data provided by a user, wherein the audio data is at substantially the same time as a digital object created by the user, wherein the audio data and the digital object are associated with a physical event and associating the formed one or more tags with the digital object;

computer readable program code that thereafter obtains search data;

computer readable program code that identifies, based upon the one or more tags, a set of stored objects corresponding to the search data, each of the stored objects within the group having at least one associated tag formed from audio data, wherein to identify comprises to select objects having a similarity to the digital object;

computer readable program code that accesses the at least one associated tag of each of the group of objects:, computer readable program code that modifies, using one or more processors, the search data based on the associated tags of the set of stored objects, the modifying comprising modifying the search data with at least one of the associated tags of the group identified as being relevant to the group and not included in the search data;

computer readable program code that searches, using one or more processors, a repository of stored tag data using the modified search data to search one or more stored tags to find matching one or more stored objects; and computer readable program code that returns, using one or more processors, one or more results of the searching, the one or more results indicating one or more stored objects associated with stored tag data.

* * * * *